(12) United States Patent  (10) Patent No.: US 9,131,143 B2
Glennie et al.  (45) Date of Patent: Sep. 8, 2015

(54) DYNAMIC REGION OF INTEREST ADAPTATION AND IMAGE CAPTURE DEVICE PROVIDING SAME

(75) Inventors: Robin Roy Glennie, Waterloo (CA); Stephen Richard D'Souza, Ottawa (CA); Joshua Lucien Daigle, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/553,896

(22) Filed: Jul. 20, 2012

(65) Prior Publication Data

US 2014/0022433 A1    Jan. 23, 2014

(51) Int. Cl.
H04N 5/222    (2006.01)
H04N 5/232    (2006.01)
H04N 5/345    (2011.01)

(52) U.S. Cl.
CPC ....... *H04N 5/23212* (2013.01); *H04N 5/23216* (2013.01); *H04N 5/23274* (2013.01); *H04N 5/23293* (2013.01); *H04N 5/23296* (2013.01); *H04N 5/3454* (2013.01)

(58) Field of Classification Search
CPC .......... H04N 5/23212; H04N 5/23216; H04N 5/3454; H04N 5/23293; H04N 5/23296
USPC ................ 348/333.02, 333.03, 333.11, 208.2
See application file for complete search history.

(56) References Cited

U.S. PATENT DOCUMENTS

| 6,211,912 B1 * | 4/2001 | Shahraray ................ 348/228.1 |
| 8,089,515 B2 | 1/2012 | Chebil |
| 2009/0015703 A1 | 1/2009 | Kim |
| 2009/0115855 A1 * | 5/2009 | Gotoh et al. ............. 348/207.11 |
| 2010/0020222 A1 | 1/2010 | Jones et al. |
| 2010/0062803 A1 | 3/2010 | Yun |
| 2010/0174421 A1 * | 7/2010 | Tsai et al. .................... 700/302 |
| 2011/0141128 A1 * | 6/2011 | Choi ............................. 345/581 |

(Continued)

FOREIGN PATENT DOCUMENTS

| EP | 1 650 958 | 4/2006 |
| JP | 2007249222 | 9/2007 |
| JP | 2007249222 A * | 9/2007 |
| JP | 2010204585 | 9/2010 |

OTHER PUBLICATIONS

Author Unknown, Setting Acquisition Parameters in the Image Acquisition Tool, Mathworks, http://www.mathworks.com/help/toolbox/imaq/bq978re.html; At least as early as May 1, 2012.

(Continued)

*Primary Examiner* — Antoinette Spinks
(74) *Attorney, Agent, or Firm* — Ridout & Maybee LLP

(57) ABSTRACT

The present disclosure provides a method of dynamic region of interest adaptation and image capture device providing same. In one embodiment, there is a method of operating an image capture device. One or more regions within a real-time image may be used to set one or more user-defined regions of interest (ROIs) within the real-time image for applying one or more first image acquisition parameters. The one or more user-defined ROIs are cancelled and one or more default ROIs within the real-time image for applying one or more second image acquisition parameters are set when a position of the image capture device has changed by an amount which exceeds a threshold amount. Digital image data is acquired by the digital image sensor in accordance with one of the one or more user-defined ROIs and the one or more default ROIs.

20 Claims, 10 Drawing Sheets

(56) References Cited

U.S. PATENT DOCUMENTS

| 2011/0161076 | A1 | 6/2011 | Davis |
| 2011/0199470 | A1 | 8/2011 | Moller |
| 2011/0249086 | A1 | 10/2011 | Guo |
| 2011/0267530 | A1 | 11/2011 | Chun |
| 2012/0084687 | A1 | 4/2012 | Sirpal |
| 2012/0084694 | A1 | 4/2012 | Sirpal |
| 2012/0176322 | A1* | 7/2012 | Karmi et al. ............ 345/173 |

OTHER PUBLICATIONS

After Effects Help /Previewing, Adobe, http://help.adobe.com/en_US/aftereffects/cs/using/WS3878526689cb91655866c1103906c6dea-7f05a.html, At least as early as May 4, 2012.

Scott Carter, Laurent Denoue, John Adcock, mVideoCast: Mobile, real time ROI detection and streaming, Submitted to CHI 2011 (Extended Abstracts), May 7-12, 2011, http://www.madpickle.net/scott/pubs/msc.pdf.

Extended European Search Report; EP 12177311.3; Dec. 19, 2012;.

Canadian Office Action, Canadian Application No. 2,820,575, Dated Oct. 16, 2014.

Linco, Reginald—Canadian Intellectual Property Office, "Examiner's Requisition" for corresponding Canadian Patent Application No. 2,820,575 dated Jul. 16, 2015.

* cited by examiner

DYNAMIC REGION OF INTEREST ADAPTATION AND IMAGE CAPTURE DEVICE PROVIDING SAME

TECHNICAL FIELD

The present disclosure relates to image capture devices, and more particularly to dynamic region of interest adaptation and an image capture device providing same.

BACKGROUND

Image capture devices, including smartphones and other multipurpose electronic devices having a built-in image capture assembly, sometimes allow a region of interest (ROI) to be set for imaging purposes, such as focusing and/or exposure metering of the image to be captured. A user of the image capture device can change the region of interest from a default region to a user-defined region. When a scene being imaged changes or the user otherwise wishes to change the ROI, the user must typically capture an image using the user-defined ROI to reset the image capture device to the default ROI or navigate a hierarchical menu to manually reset the image capture device to the default ROI. It is widely known that the image capture process is very dynamic in that a scene may change very quickly due to movements of the subject, changing lighting conditions, etc. Accordingly, even small delays in capturing or acquiring an image may result in a change in the scene being imaged and a lost opportunity to capture an image. Accordingly, there remains a need for more convenient and/or intelligent methods of controlling the ROI.

DETAILED DESCRIPTION

Figure 1:
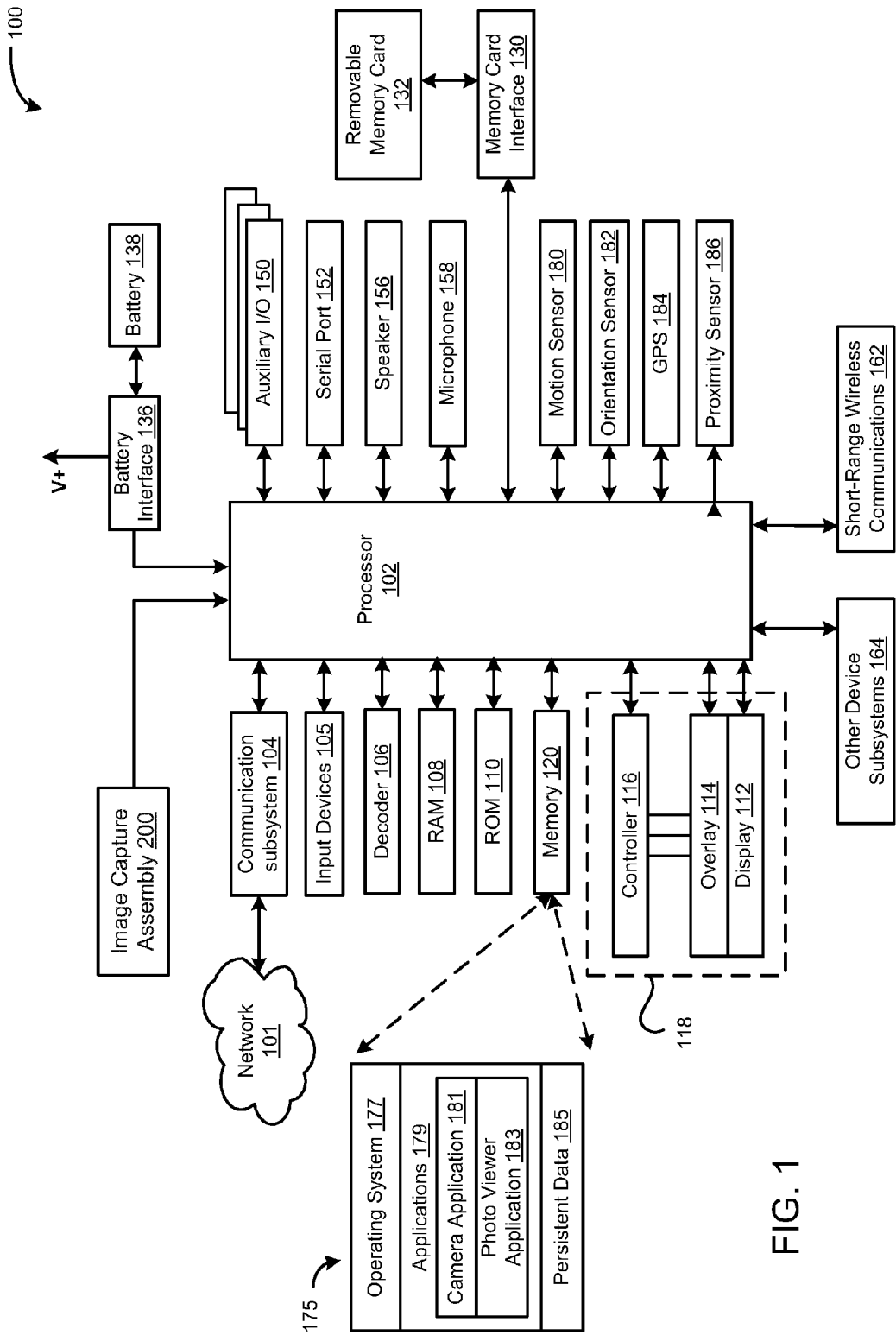
FIG. 1 is a block diagram illustrating an image capture device suitable for carrying out example embodiments of the present disclosure.

Reference will now be made to the accompanying drawings which show example embodiments of the present disclosure. For simplicity and clarity of illustration, reference numerals may be repeated among the Figures to indicate corresponding or analogous elements. Numerous details are set forth to provide an understanding of the example embodiments described herein. The example embodiments may be practised without some of these details. In other instances, well-known methods, procedures, and components have not been described in detail to avoid obscuring the example embodiments described. The description is not to be considered as limited to the scope of the example embodiments described herein.

Any reference to direction or orientation stated herein is for convenience and is not intended to be limiting unless explicitly stated herein. Any directional references in relation to the graphical user interface (GUI) are relative to the screen orientation of the GUI rather than a fixed point or reference on the host electronic device. The term "user interface" is sometimes used herein to refer to the GUI for convenience.

The present disclosure provides a method of dynamic region of interest adaptation and an image capture device providing same.

In accordance with one example embodiment, there is provided a method of operating an image capture device, the method comprising: displaying a real-time image on a display of the image capture device, the real-time image being based on digital image data acquired by a digital image sensor; receiving a selection of one or more regions within the real-time image; setting, in response to the selection, the one or more regions of the selection as one or more user-defined regions of interest (ROIs) within the real-time image for applying one or more first image acquisition parameters; cancelling the one or more user-defined ROIs and setting one or more default ROIs within the real-time image for applying one or more second image acquisition parameters when a position of the image capture device has changed by an amount which exceeds a threshold amount; and acquiring digital image data by the digital image sensor in accordance with one of the one or more user-defined ROIs and the one or more default ROIs.

In accordance with another example embodiment, there is provided a method of operating an image capture device, the method comprising: displaying a real-time image on a touch-sensitive display of the image capture device, the real-time image being based on digital image data acquired by a digital image sensor; receiving a selection of one or more regions within the real-time image; setting, in response to the selection, the one or more regions of the selection as one or more user-defined ROIs within the real-time image for applying one or more first image acquisition parameters; cancelling the one or more user-defined ROIs and setting one or more default ROIs within the real-time image for applying one or more second image acquisition parameters when a designated touch gesture is detected on the touch-sensitive display; and acquiring digital image data by the digital image sensor in accordance with one of the one or more user-defined ROIs and the one or more default ROIs.

In accordance with a further example embodiment, there is provided an image capture device, comprising: a digital image sensor; a display; an image encoder for encoding digital image data into still images; and an image processor coupled to the digital image sensor, image encoder and display, the image processor being configured to perform the method(s) set forth herein.

In accordance with yet a further embodiment of the present disclosure, there is provided a computer readable medium having computer readable instructions stored thereon that, when executed, causes a processor to perform the method(s) set forth herein.

Image Capture Device Construction

Reference is first made to FIG. 1 which illustrates an image capture device 100 in which example embodiments described in the present disclosure can be applied. The image capture device 100 described below has wireless communication capabilities; however, it is contemplated that the teachings of the present disclosure may be applied to devices without wireless communication capabilities. In some example embodiments, the image capture device 100 is a mobile phone, smartphone or superphone, or tablet computer. In other example embodiments, the image capture device 100 may be a notebook computer (also known as a laptop, netbook or ultrabook computer depending on the device capabilities), wireless organizer or personal digital assistant (PDA), electronic gaming device, or a digital camera (which may be capable of both still image and video image capture). Other examples of the image capture device 100 are possible.

The image capture device 100 includes a rigid case (not shown) housing the electronic components of the image capture device 100. The electronic components of the image capture device 100 are mounted on a printed circuit board (not shown). The image capture device 100 includes a controller comprising at least one processor 102 (such as a microprocessor) which controls the overall operation of the image capture device 100. Communication functions, including data and voice communications, are performed through a communication subsystem 104. Data received by the image capture device 100 may be decompressed and decrypted by a decoder 106. The communication subsystem 104 receives messages from and sends messages to a wireless network 101. The wireless network 101 may be any suitable type of wireless network.

The processor 102 interacts with other components, such as one or more input devices 105, Random Access Memory (RAM) 108, Read Only Memory (ROM) 110, a display 112 such as a colour liquid crystal display (LCD), persistent (non-volatile) memory 120 which may be flash erasable programmable read only memory (EPROM) memory ("flash memory") or any other suitable form of memory, an image capture assembly 200, a motion sensor 180 which enables to processor 102 to determine whether the image capture device 100 is in motion and the nature of any sensed motion at any appropriate time, an orientation sensor 182 which enables the processor 102 to determine which direction the image capture device 100 is pointed at any appropriate time, a global positioning system (GPS) device 184 which enables the processor 102 to determine GPS coordinates (i.e., location) of the image capture device 100 at any appropriate time, a proximity sensor 186 which enables the processor 102 to determine a proximity of the image capture device 100 to an object at any appropriate time, auxiliary input/output (I/O) subsystems 150, data port 152 such as serial data port (e.g., Universal Serial Bus (USB) data port), speaker 156, microphone 158, short-range communication subsystem 162, and other device subsystems generally designated as 164. The components of the image capture device 100 are coupled via a communications bus (not shown) which provides a communication path between the various components.

The display 112 typically includes a display area in which information may be displayed and a non-display area extending around the periphery of the display area. Information is not displayed in the non-display area. The non-display area may be utilized to accommodate, for example, electronic traces or electrical connections, adhesives or other sealants, and/or protective coatings around the edges of the display area.

The display 112 may be provided as part of a touch-sensitive display 118 which provides an input device. The display 112 which together with a touch-sensitive overlay 114 operably coupled to an electronic controller 116 comprise the touch-sensitive display 118. The touch-sensitive display 118 is typically a capacitive touch-sensitive display 118 which includes a capacitive touch-sensitive overlay may be any other suitable touch-sensitive display 118, such as a resistive, infrared, surface acoustic wave (SAW) touch-sensitive display 118, strain gauge, optical imaging, dispersive signal technology, acoustic pulse recognition, and so forth, as known in the art. The overlay 114 of the touch-sensitive display 118 may be an assembly of multiple layers in a stack which may include, for example, a substrate, a ground shield layer, a barrier layer, one or more capacitive touch sensor layers separated by a substrate or, other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch inputs, touch contacts or touch events, may be detected by the touch-sensitive display 118. Alternatively, the processor 102 may be configured to detect one or more touch gestures in accordance with touch data provided by the touch-sensitive overlay 114. The processor 102 may determine attributes of the touch, including a location of a touch. Touch location data may include an area of contact or a single point of contact, such as a point at or near a center of the area of contact known as the centroid. A signal is provided to the controller 116 in response to detection of a touch. A touch may be detected from any suitable object, such as a finger, thumb, appendage, or other items, for example, a stylus, pen, or, other pointer, depending on the nature of the touch-sensitive display 118. The location of the touch moves as the detected object moves during a touch. The controller 116 and/or the processor 102 may detect a touch by any suitable contact member on the touch-sensitive display 118. Similarly, multiple simultaneous touches, are detected.

Different types of touch events are detected by the touch-sensitive display 118. A touch and hold event is detected or recognized when a touch event occurs for a duration which is greater than or equal to a threshold duration. The threshold duration may be, for example, 400 milliseconds in some embodiments. Other threshold durations are possible. A tap event is detected or recognized when at least one touch event occurs for a duration which is less than the threshold duration.

A one-finger touch and hold event occurs when a user touches a selectable onscreen item on the touch-sensitive display 118, such as a button or menu item, with one finger and holds the finger in contact with the touch-sensitive display 118 for a duration which exceeds the threshold duration.

A two-finger touch and hold event occurs when a user touches a selectable onscreen item on the touch-sensitive display 118 with two-fingers and holds both fingers in contact with the touch-sensitive display 118 for a duration which exceeds the threshold duration. Touching a selectable onscreen item comprises touching a location of the touch-sensitive display 118 which is coincident with the selectable onscreen item displayed on the display 112. A location is coincident with the selectable onscreen item in that the centroid of the touch event is within an input area of the user interface screen assigned for receiving input for activating the selectable onscreen item. The input area of the selectable onscreen item may be different than the displayed area of the selectable onscreen item on the display screen 112 in some embodiments, typically the input area being larger than the displayed area in such embodiments to accommodate touch offset of the user.

The term "touch gesture" or "gesture" is used herein to refer to a particular type of touch event on a touch-sensitive display 118 that begins at an origin point and continues to an end point. A touch gesture may be identified by attributes of the touch gesture, including the origin point, the end point, the distance travelled, the duration, the velocity, and the direction, for example. A touch gesture may be long or short in distance and/or duration. Two points of the touch gesture may be utilized to determine a direction of the touch gesture.

A drag gesture occurs when contact is maintained within the touch-sensitive display 118 and the touch point (e.g., centroid of the touch event) moves more than a threshold distance (typically measured in pixels). The drag gesture ends when contact with the touch-sensitive display 118 ends.

A swipe (also known as a flick) is one type of touch gesture. A swipe has a single direction. The touch-sensitive overlay 114 may evaluate swipes with respect to the origin point at which contact is initially made with the touch-sensitive overlay 114 and the end point at which contact with the touch-sensitive overlay 114 ends rather than using each of location or point of contact over the duration of the touch gesture to resolve a direction. Examples of swipes include a horizontal swipe, a vertical swipe, and a diagonal swipe. A horizontal swipe typically comprises an origin point towards the left or right side of the touch-sensitive overlay 114 to initialize the touch gesture, a horizontal movement of the detected object from the origin point to an end point towards the right or left side of the touch-sensitive overlay 114 while maintaining continuous contact with the touch-sensitive overlay 114, and a breaking of contact with the touch-sensitive overlay 114. Similarly, a vertical swipe typically comprises an origin point towards the top or bottom of the touch-sensitive overlay 114 to initialize the touch gesture, a vertical movement of the detected object from the origin point to an end point towards the bottom or top of the touch-sensitive overlay 114 while maintaining continuous contact with the touch-sensitive overlay 114, and a breaking of contact with the touch-sensitive overlay 114.

Swipes can be of various lengths, can be initiated in various places on the touch-sensitive overlay 114, and need not span the full dimension of the touch-sensitive overlay 114. In addition, breaking contact of a swipe can be gradual in that contact with the touch-sensitive overlay 114 is gradually reduced while the swipe is still underway.

Meta-navigation touch gestures may also be detected by the touch-sensitive display 118. A meta-navigation touch gesture is a touch gesture that has an origin point that is outside the display area of the touch-sensitive display 118 and that moves to a position on the display area of the touch-sensitive display 118. Other attributes of the touch gesture may be detected and be utilized to detect the meta-navigation touch gesture. Meta-navigation touch gestures may also include multi-touch touch gestures in which touch gestures are simultaneous or overlap in time and at least one of the touches has an origin point that is outside the display area and moves to a position on the display area of the touch-sensitive display 118. Thus, two fingers may be utilized for meta-navigation touch gestures. Further, multi-touch meta-navigation touch gestures may be distinguished from single touch meta-navigation touch gestures and may provide additional or further functionality.

The touch-sensitive display 118 is described herein in the context of fingers of a device user for purposes of convenience only. As mentioned previously, a stylus or other object may be used for interacting with the touch-sensitive display 118 depending on the type.

User-interaction with the GUI is performed through the input devices 105. Information, such as text, characters, symbols, images, icons, and other items are rendered and displayed on the display 112 via the processor 102. The processor 102 may interact with the orientation sensor to detect direction of gravitational forces or gravity-induced reaction forces so as to determine, for example, the orientation of the image capture device 100 in order to determine a screen orientation for the GUI.

The input devices 105 may include a keyboard, control buttons such as a power toggle (on/off) button (not shown), a camera button (not shown) for enabling a camera mode, a capture button (not shown) for enabling an image capture sequence when in the camera mode, zoom buttons (not shown) for enabling a selection of a zoom setting when in the camera mode, and a navigation device (not shown) for navigating through onscreen items, such as digital images, menu choices and the like which are displayed on the display 112. When the display 112 is provided as part of a touch-sensitive display 118, the capture button, zoom buttons and other camera controls may be provided by onscreen user interface elements displayed on the display 112 instead of, or in addition to, physical interface components. The keyboard may be provided instead of, or in addition to, a touch-sensitive display 118 depending on the embodiment. At least some of the control buttons may be multi-purpose buttons rather than special purpose or dedicated buttons.

The image capture device 100 also includes a memory card interface 130 for receiving a removable memory card 132 comprising persistent memory, such as flash memory. A removable memory card 132 can be inserted in or coupled to the memory card interface 130 for storing and reading data by the processor 102 including, but not limited to still images and optionally video images captured by the image capture assembly 200. Other types of user data may also be stored on the removable memory card 132. Other types of removable digital image storage media, such as magnetic hard drives, magnetic tape, or optical disks, may be used in addition to, or instead of, the removable memory card 132.

The processor 102 operates under stored program control and executes software modules 175 stored in memory, for example, in the persistent memory 120. As illustrated in FIG. 1, the software modules 175 comprise operating system software 177 and software applications 179. The software applications 179 include a camera application 181 and photo viewer application 183. The camera application 181 contains the logic for operating the image capture assembly 200 and capturing still images and optionally video images from the image capture assembly 200 and storing the still images and video images in the persistent memory 120. The photo viewer application 183 contains logic for displaying data (i.e., still images and optionally video images) from the persistent memory 120 and data from the image capture assembly 200 on the display 112. Persistent data 185, such as user data, can also be stored in the persistent memory 120. The persistent data 185 may include digital media files stored in the image capture device 100 such as still images and/or video images captured by the image capture assembly 200, or other still images and/or video images transferred, downloaded or otherwise stored on the persistent memory 120.

The software modules 175 or parts thereof may be temporarily loaded into volatile memory such as the RAM 108. The RAM 108 is used for storing runtime data variables and other types of data or information. Although specific functions are described for various types of memory, this is merely one example, and a different assignment of functions to types of memory could also be used.

Still images and optionally video images captured by the image capture assembly 200 are stored in persistent memory after being captured. The persistent memory may be one or any combination of the internal persistent memory 120, the removable memory card 132 or remote persistent storage. The remote persistent storage may be a cloud based resource, such as a remote content server, accessible by the wireless network 101 or possibly via a wireline (e.g., via the data port 152) or short-range wireless connection (e.g., via the short-range communication subsystem 162) to a host computer having wireline access to the cloud based resource. The location at which captured still images and optionally video images is stored is typically a configurable setting which may be set by a user either in advance or at the time of capture.

The camera application 181 and/or photo viewer application 183 can access the remote persistent storage and optionally cloud based applications through the wireless network 101 or possibly via a wireline or short-range wireless connection to a host computer having wireline access to the cloud based resource. The use of cloud based or other remote persistent storage allows access to still images and optionally video images captured the image capture assembly 200 from nearly any computer or portable electronic device having access to the Internet.

The image capture device 100 also includes a battery 138 as a power source, which is typically one or more rechargeable batteries that may be charged, for example, through charging circuitry coupled to a battery interface such as the serial data port 152. The battery 138 provides electrical power to at least some of the electrical circuitry in the image capture device 100, and the battery interface 136 provides a mechanical and electrical connection for the battery 138. The battery interface 136 is coupled to a regulator (not shown) which provides power V+ to the circuitry of the image capture device 100.

A received signal, such as a text message, an e-mail message, or web page download, is processed by the communication subsystem 104 and input to the processor 102. The processor 102 processes the received signal for output to the display 112 and/or to the auxiliary I/O subsystem 150. A subscriber may generate data items, for example e-mail messages, which may be transmitted over the wireless network 101 through the communication subsystem 104, for example.

The motion sensor 180 may comprise an accelerometer (such as a three-axis accelerometer) or other suitable motion sensor. The orientation sensor 182 may comprise an accelerometer (such as a three-axis accelerometer), electronic compass, gyroscope, or a combination thereof. Other suitable orientation sensors could be used instead of, or in addition to, the accelerometer, electronic compass and gyroscope. The motion sensor 180 and orientation sensor 182, or parts thereof, may be combined or shared, for example, within an integrated component. The processor 102, or controller (not shown) of a three-axis accelerometer, can convert acceleration measurements into device orientations.

The image capture device 100 may connect to a host personal computer (not shown) via the serial data port 152 or short-range communication subsystem 162 communicating over a suitable interconnection, such as a USB connection, Firewire™ connection, Bluetooth™ connection or the like.

Figure 2:
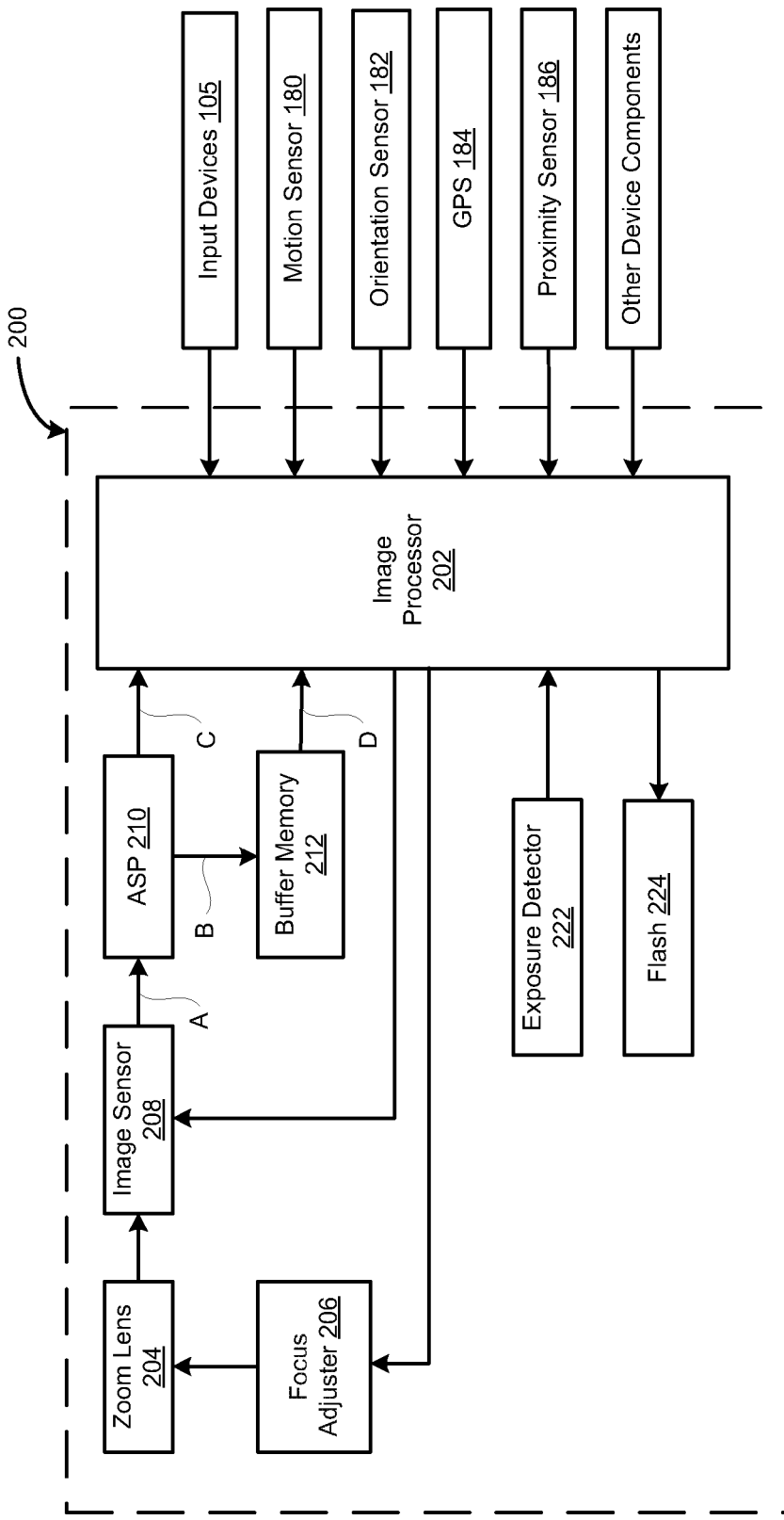
FIG. 2 is a block diagram illustrating an image capture assembly of the electronic device of FIG. 1.

Referring now to FIG. 2, an example embodiment of the image capture assembly 200 of the image capture device 100 will be described in more detail. The image capture assembly 200 includes an image processor 202 which performs various image processing functions described below. The image processor 202 is typically a programmable image processor but could be, for example, a hard-wired custom integrated circuit (IC) processor, a general purpose microprocessor, or a combination of hard-wired custom IC and programmable processors. When the image capture assembly 200 is part of a multipurpose electronic device such as a mobile phone, smartphone or superphone, at least some of the functions of the image capture assembly 200 may be performed by the main processor 102 of the host image capture device 100. It is contemplated that all of the functions performed by the image processor 202 could be performed by the main processor 102, in which case the image processor 202 can be omitted. Furthermore, the image capture assembly 200 has access to various components of the host image capture device 100, and can receive inputs from and send outputs to various components of the host image capture device 100, input such as the input devices 105, motion sensor 180, orientation sensor 182, GPS 184, RAM 108, persistent memory 120 and the like.

The image capture assembly 200 in some embodiments also includes a zoom lens 204 which is controlled by a focus adjuster 206, such as zoom and focus motors, which adjust the focal length and focus distance of the zoom lens 204 to focus the light which passes through the zooms lens 204 and is received by the image sensor 208. The zoom lens 204 has a variable aperture the size of which is expressed by an f-number (sometimes called focal ratio, f-ratio, f-stop, or relative aperture) which is a measure of the diameter of the aperture of the zoom lens 204. The f-number is the focal length divided by the "effective" aperture diameter. The f-number is a dimensionless number that is a quantitative measure of lens "speed".

The zoom lens 204 passes light to an image sensor 208 which forms an image thereon. The image sensor 208 may have a number of aspect ratios, such as a 4:3 and 16:9 image aspect ratios, and a number of image resolutions. In some embodiments, the image sensor 208 is a charge-coupled device (CCD) sensor; however, a complementary metal-oxide semiconductor (CMOS) sensor or other suitable image sensor could be used. An adjustable aperture and shutter assembly (not shown) in the zoom lens 204 is used to control the aperture size and the exposure time of the image sensor 208. In other embodiments, the zoom lens 204 could be replaced with a fixed focal length lens (also known as a "prime" lens) in which case the focus adjuster 206 merely adjusts the focus distance of the lens. Digital zoom may be provided by digital image processing performed by the image processor 202 of the image capture assembly 200 or processor 102 (rather than optical zoom provided by the zoom lens 204). In other embodiments, the shutter assembly could be omitted in favour of an electronic shutter.

The image processor 202 controls the image sensor 208 by supplying various control signals to the image sensor 208. The image processor 202 also controls the focus adjuster 206, and a flash 224 for emitting light to illuminate the area within the field of view of the zoom lens 204. The input devices 105 provide user controls which can control the operation of the image capture assembly 200. A captured image signal A output by the image sensor 208 is temporarily stored in a buffer memory 212, such as a Dynamic Random Access Memory (DRAM) buffer memory.

The image processor 202 produces focus signals, typically in response to a pressing or other activation of the capture button, which drive the focus adjuster 206 (e.g., zoom and focus motors) to adjust the focus of the zoom lens 204 to focus the image which is formed on the image sensor 208 and which provides the image sensor output for the captured image signal. A passive autofocus system is typically provided by the image capture device 100. In the passive autofocus system, a captured image signal A is provided to the image processor 102 which performs autofocus calculations on the captured image signal A. Focus signals are sent to the focus adapter 206 to adjust the focus distance of the zoom lens 204 as necessary as a result of the output of the autofocus calculations. The autofocus calculations are typically performed using either contrast detection or phase detection methods which rely on moving the zoom lens 204 to make minor adjustments in the focus distance until a maximal (or optimal) contrast is obtained. The autofocus calculations assume that maximal (or optimal) contrast corresponds to maximal sharpness. The nature of the autofocus calculations is outside the scope of the present disclosure and will not be described in further detail herein. Autofocus methods and calculations suitable for use by the image processor 202 are well known in the art and will be readily known to the skilled person.

The image processor 202 may continuously produce focus signals thereby providing continuous autofocus when the image capture assembly 200 is in an active or ready-to-capture state (rather than an inactive state such as when displaying a full screen menu) such that the images being stored to the buffer memory 212 are focused images rather than performing autofocus operations in response to the activation of the capture button as mentioned previously.

In other embodiments, an active autofocus system could be used instead of the passive autofocus system described above. The active autofocus system may include an infrared (IR) emitter and IR sensor which determines a distance from the IR emitter to an object at the focus point using the time for reflected IR waves to return to the IR sensor and/or the intensity of the reflected IR waves. The focus adjuster 206 moves the zoom lens 204 in accordance with the determined distance.

The captured image signal A may also be output to the display 112 to provide a preview image. The captured image signal A may be used to provide a real-time or "live" preview in which a real-time image (or an approximation of an image) of the image captured with the image sensor 208 is displayed on the display 112 as a thumbnail image (e.g., reduced size/resolution version) of the captured image for graphical processing efficiency, or alternatively a dedicated electronic viewfinder device.

In a single image capture mode, a captured image signal D provided by the buffer memory 212 is output to and undergoes normal processing by the image processor 202 to produce processed digital image data, which may contain a still digital image or a video image, encoded as a digital image file, and stored in persistent memory 120.

In a burst mode (or continuous capture mode), a captured image signal D provided by the buffer memory 212 is output to and undergoes basic processing by the image processor 202 to produce basic processed digital image data, encoded as an encoded digital image file, and stored in persistent memory 120. The path from the image sensor 208 to the image processor 202 for encoding while in burst mode is sometimes known as the burst pipe. The processing occurs at a speed fast enough to keep up with the image capture speed of the image sensor, in some cases between 15 fps and 30 fps. The processing in the burst pipe may be slower or faster in other embodiments. The speed depends on the capabilities of the overall system. The processing in the burst pipe is usually of lower quality than the processing mentioned above that is performed subsequent to the image signal stored to the buffer memory 212 in single image capture mode. The images produced in burst mode may be of the same resolution as the images produced in single image capture mode.

Non-limiting examples of the encoding that CaO be performed are JPEG (Joint Photographic Experts Group), JPEG 2000, TIFF (Tagged Image File Format), and Exif (Exchangeable image file format) encoding. The encoded digital images can then be stored, used for producing panorama images, used in a retro-active burst application (such as temporal bracketing), used for image stabilization or any other application which used images from burst mode. Concurrently with the encoding of the digital image files, the digital image files or in some embodiments, raw data from the image sensor 208, are sent to the buffer memory 212. The data stored in the buffer memory 212 is then used to perform higher quality processing, such as but not limited to, advanced noise filtering before sending the data to be encoded.

The buffer memory 212 may also be used to eliminate shutter lag in what is sometimes referred to as a "zero" or "negative" shutter lag mode. A sequence of images acquired from the image sensor 208 is stored in the buffer memory 212 in a chronological order of a time at which the images were captured. The images are typically stored in association with a date and/or time at which the images were captured to assist subsequent retrieval and/or processing, e.g. for accessing and retrieval of images based on the chronological order. When in a zero shutter lag mode, images are continuously sampled and stored to the buffer memory 212 up to a set limit. The limit of the buffer memory 212 is typically a number of images, e.g., 1, 2, 3, 4, 5, 10, 25 or other suitable number which depends on a frame rate of the image sensor 208 (the number of frames per second (fps) captured by the image sensor 208) and other factors. The limit of the buffer memory 212 could be another suitable limit such as a total size of the image or a duration of capture (e.g., all images take in the last n number of seconds). The limit of the buffer memory 212 may be configurable in some embodiments. The limit is set so that the captured images stored in the buffer memory 212 are generally contemporaneous with the real-time preview image. Accordingly, the limit of the buffer memory 212 depends largely on the frame rate.

The zero shutter lag mode differs from a burst mode in that the images are only temporarily stored in the buffer memory 212 and that the sampling is continuous rather than being dependent on the activation of the capture button. In the zero shutter lag mode, the capture button cannot be activated as the capture button is the trigger for changing the storage of the captured images from temporary storage in the buffer memory 212 to persistent storage in the memory 120 or removable memory card 132.

The real-time image displayed on the display 112 is synchronized with the images stored in the buffer memory 212 such that, when the capture button is activated, the image in the buffer memory 212 which corresponds to the real-time image displayed on the display 112 when the capture button was activated is selected from the buffer memory 212 for further processing by the image processor 202, and is stored in persistent memory such as the persistent memory 120 or the removable memory card 132. In this manner, the image displayed to the user corresponds to the image captured by the image capture assembly 200, thereby providing no shutter lag.

The image processor 202 may perform various other image processing functions, including colour interpolation and colour and tone correction to produce rendered image data, such as standard Red Green Blue (sRGB) image data. The rendered image data is then stored in the memory of the removable memory card 132 or persistent memory 120. In some embodiments, the rendered image data may be compressed before storing, for example, the rendered image data may be JPEG compressed and stored as a JPEG image file, which may be in the Exchangeable image file (Exif) format or other suitable format which preferably supports image metadata, such as one or more of a date/time the image was captured, f-number of the zoom lens 204 at which the image was captured, GPS location and pointing direction when the image was captured and possibly other camera settings.

The processing performed by the image processor 202 is typically controlled by firmware stored in a firmware memory (not shown), which may be flash memory or any other suitable form of memory. The image processor 202 processes the digital input image from the buffer memory 212, using RAM memory (such as RAM 108 of the host electronic device or possibly separate, dedicated RAM) to store intermediate results during processing.

While the components of the image capture device 100 are shown as separate blocks in FIGS. 1 and 2, the functions of various components may be combined in actual processing elements, circuits and the like. Furthermore, some of the functional blocks of FIGS. 1 and 2 may be separated into one or more sub blocks when implemented in actual processing elements, circuits and the like.

Electronic Viewfinder

Figure 3A:
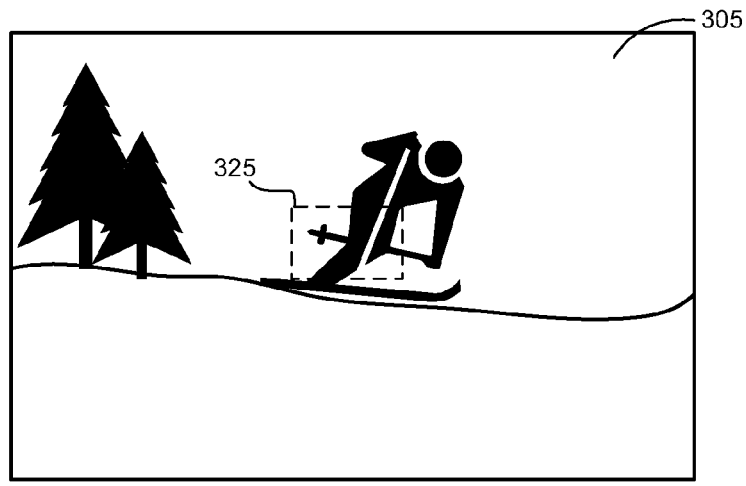
FIGS. 3A to 3C are schematic representations of different embodiments of a user interface screen providing an electronic viewfinder in accordance with example embodiments of the present disclosure.
Figure 3B:
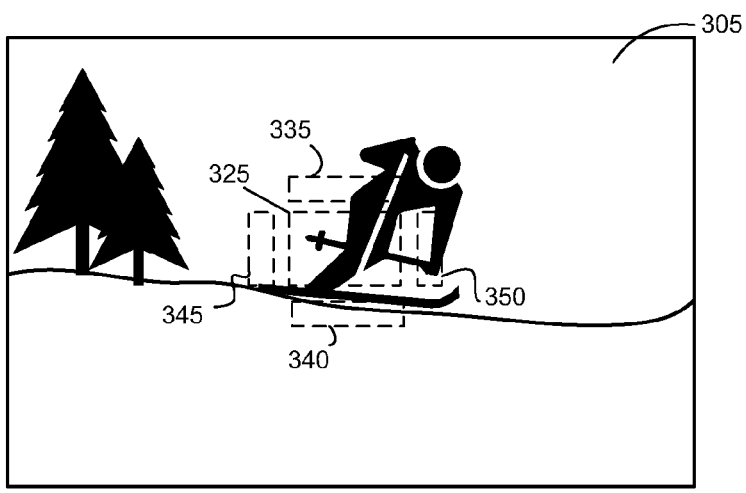
Figure 3C:
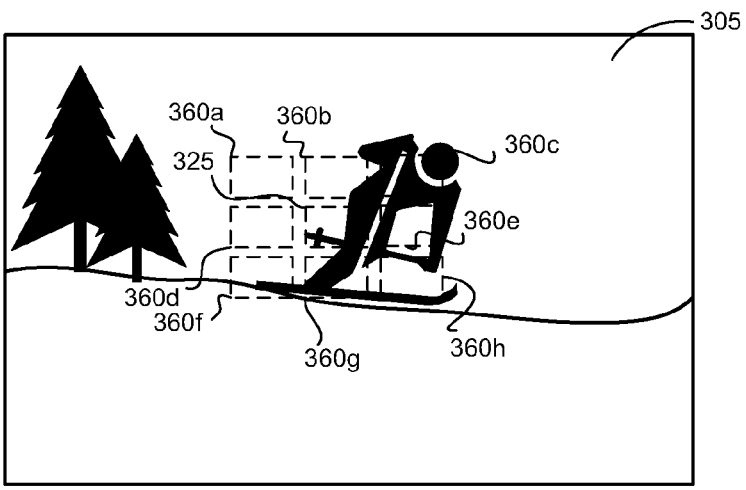

FIGS. 3A to 3C are schematic representations of different embodiments of a user interface screen providing an electronic viewfinder in accordance with example embodiments of the present disclosure. FIG. 3A shows an example embodiment of a user interface (UI) screen providing an electronic viewfinder which displays a real-time or "live" image 305 (or an approximation of an image) being captured with the image capture device 100 by the digital image sensor 208. In the shown embodiment, the electronic viewfinder occupies all or substantially all of the viewable area of the display 112. In other embodiments, the electronic viewfinder could occupy a lesser portion of the display 112.

The UI screen also includes a default ROI 325 located in the centre of the real-time image 305 in the shown embodiment. The default ROI 325 identifies the centre of the real-time image 305 to be used for imaging purposes, such as focusing and/or exposure metering of the image to be captured. While not shown, the UI screen may also include onscreen buttons such as a menu button (not shown) for causing a menu for the camera application 181 of the image capture device 100 to be displayed and a mode button (not shown) 210 which indicates whether the image capture device 100 is in a still image mode or video camera mode and causing toggling or switching between the still image mode and video camera mode.

FIG. 3B shows another example embodiment of a UI screen providing an electronic viewfinder which displays a real-time image 305 (or an approximation of an image) being captured with the image capture device 100 by the digital image sensor 208 which differs from that shown in FIG. 3A in the number of ROIs. The UI screen also includes five (5) default ROIs including a centre ROI 325 located in the centre of the real-time image 305, a top ROI 335 located above the centre ROI 325, a bottom ROI 340 located below the centre ROI 325, a left ROI 345 located left of the centre ROI 325, and a right ROI 350 located right of the centre ROI 325. The default ROIs 325 identify regions of the real-time image 305 to be used for imaging purposes, such as focusing and/or exposure metering of the image to be captured.

FIG. 3C shows a further example embodiment of a UI screen providing an electronic viewfinder which displays a real-time image 305 (or an approximation of an image) being captured with the image capture device 100 by the digital image sensor 208 which differs from that shown in FIGS. 3A and 3B in the number of ROIs. The UI screen also includes nine (9) default ROIs including a centre ROI 325 located in the centre of the real-time image 305, a top-left ROI 360a located above and to the left of the centre ROI 325, a top-centre ROI 360b located above the centre ROI 325, a top-right ROI 360c located above and to the right of the centre ROI 325, a left ROI 360d located left of the centre ROI 325, a right ROI 360e located right of the centre ROI 325, a bottom-left ROI 360f located below and to the left of the centre ROI 325, a bottom-centre ROI 360g located below the centre ROI 325, and a bottom-right ROI 360h located below and to the right of the centre ROI 325. The default ROIs 325 identify regions of the real-time image 305 to be used for imaging purposes, such as focusing and/or exposure metering of the image to be captured.

Setting User-Defined ROIs

Figure 4A:
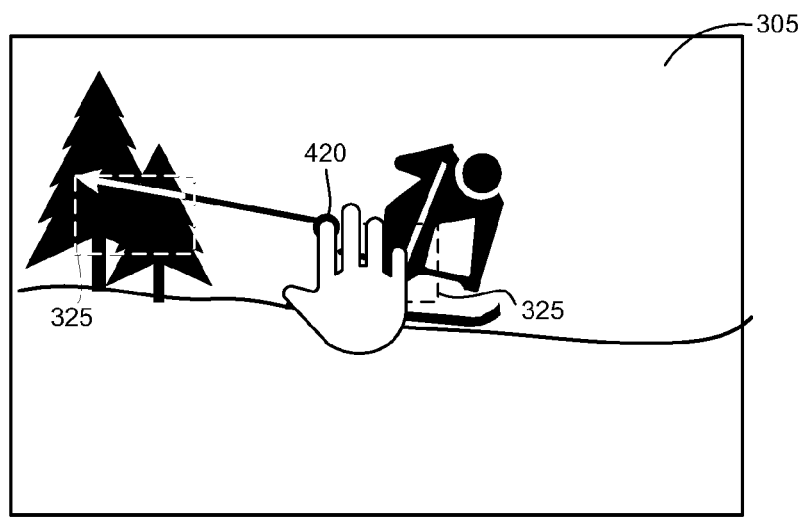
FIGS. 4A to 4C are schematic representations of a first embodiment of a user interface screen providing an electronic viewfinder which illustrate a method of setting an ROI in accordance with an example embodiment of the present disclosure.
Figure 4B:
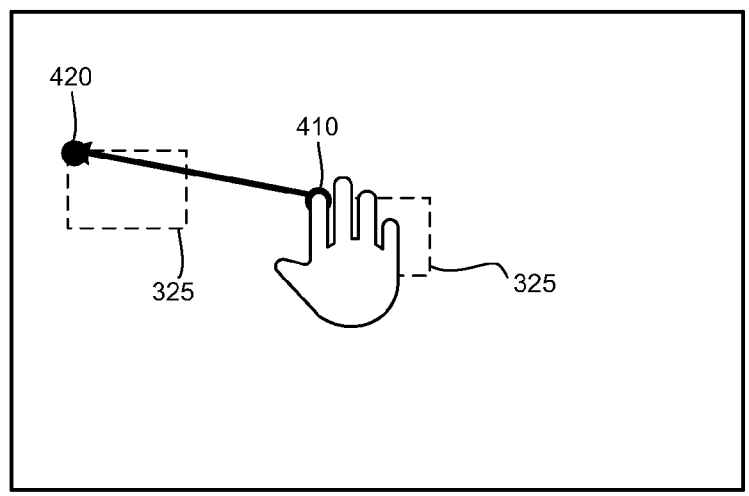
Figure 4C:
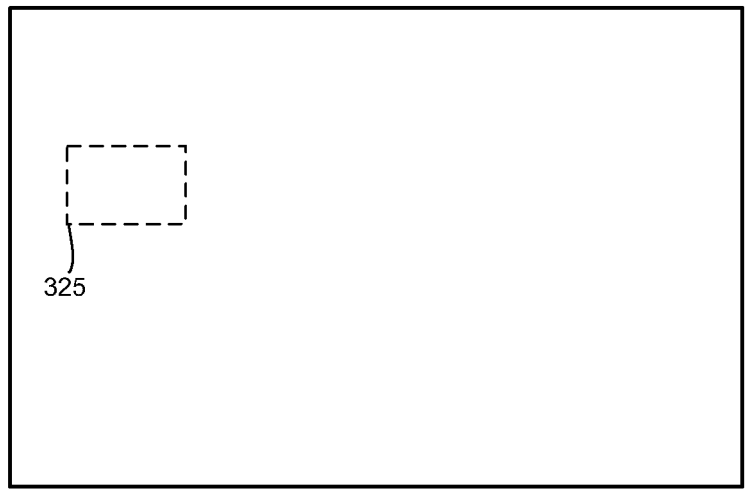

Referring now to FIGS. 4A to 4C, a method of setting an ROI in accordance with an example embodiment of the present disclosure will be described. The method may be carried out, at least in part, by firmware or software such as the camera application 181, executed by the processor 102 and/or image processor 202. Coding of software for carrying out such a method is within the scope of a person of ordinary skill in the art provided the present disclosure. The method may contain additional or fewer processes than shown and/or described, and may be performed in a different order. Computer-readable code executable by at least one processor 102 and/or image processor 202 to perform the method may be stored in a computer-readable medium such as the persistent memory 120.

FIG. 4A shows an electronic viewfinder which displays a real-time image 305 captured by the digital image sensor 208, similar to FIG. 3A, in accordance with one embodiment of the present disclosure. A default ROI 325 is defined by the image processor 202 and displayed on the display 112 using a boundary line which overlays the real-time image 305. The boundary line is shown in dotted lines in the illustrated embodiment. The default ROI is located in the centre of the real-time image 305 in the illustrated embodiment. In the shown embodiment, the display 112 is part of a touch-sensitive display 118 and a drag touch gesture (sometimes referred to as a touch and drag gesture) may be used to Seta user-defined ROI by moving the default ROI to a user-designated location. Typically, the use of a drag touch gesture to set a user-defined ROI comprises touching the default ROI 325 and dragging the default ROI 325 from the centre of the real-time image 305 to a user-designated location. In the FIG. 4A, the entire default ROI 325 is moved leftwards from a region in the real-time image 305 associated with a skier to a region in the real-time image 305 associated with trees. In some embodiments, a starting point of the drag touch gesture must overlap with a boundary of the default ROI to initiate a move of the default ROI. In other embodiments, the starting point of the drag touch gesture may be anywhere within the default ROI.

FIGS. 4B and 4C show the electronic viewfinder without the real-time image 305 so that the starting position 410 and ending position 420 of the ROI can be seen without obstruction. As shown in FIGS. 4B and 4C, the drag touch gesture can be used to easily set a user-defined ROI by moving the default ROI from a default position (shown in FIG. 4B) to a new position (shown in FIG. 4C). In other embodiments, other input may be used for selection of one or more regions within the real-time image 305. For example, a selection of one or more regions within the real-time image 305 may be caused by tapping a user-designated location on the touch-sensitive display 118 to reposition the default ROI 325 at the user-designated location, or to create one or more new user-defined ROIs at user designation locations. This may occur with or without cancelling the default ROI 325. In some embodiments, user-defined and default ROIs may be cancelled, for example by tapping or touching the respective ROIs, to change the ROIs being used. This allows a user to quickly remove an ROI, for example, to reduce the number of ROIs being used or because removal of an ROI and adding a new ROI may be more efficient than moving the ROI. Nevertheless, the ROIs remaining after a cancelling operation may be moved as described above and new ROIs may be added should the user decided after cancelling an ROI. Alternatively, the default ROI 325 may be moved or one or more new user-defined ROIs may be created at user-designated locations using a navigation device (not shown) to provide similar functionality as tapping or touching the touch-sensitive display 118 as described above. A suitable navigation device includes, but is not limited to, a depressible touchpad or trackpad (which detects gestures performed on or near the touchpad or trackpad as navigational input and detects depression of the touchpad or trackpad as selection input) or other device providing equivalent functionality.

Figure 5A:
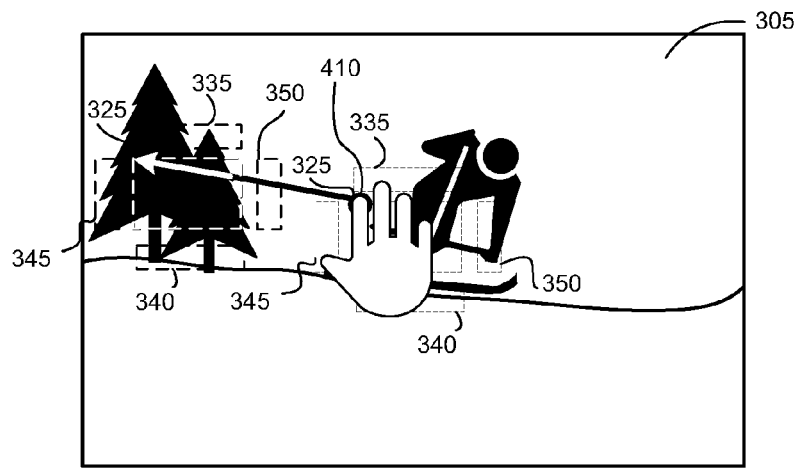
FIGS. 5A to 5C are schematic representations of a second embodiment of a user interface screen providing an electronic viewfinder which illustrate a method of setting an ROI in accordance with an example embodiment of the present disclosure.
Figure 5B:
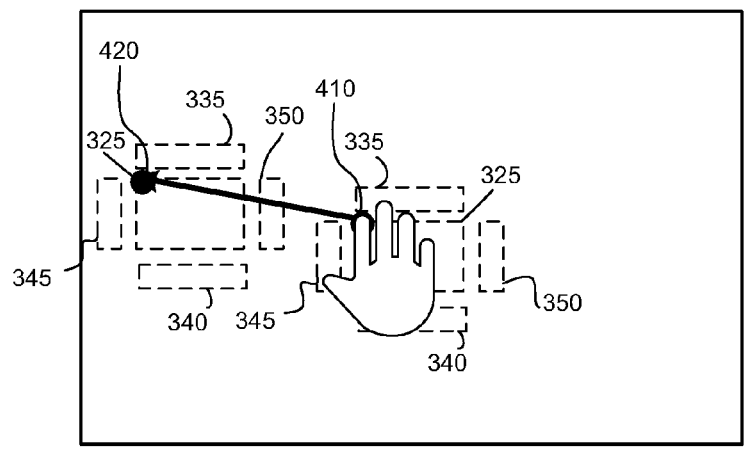
Figure 5C:
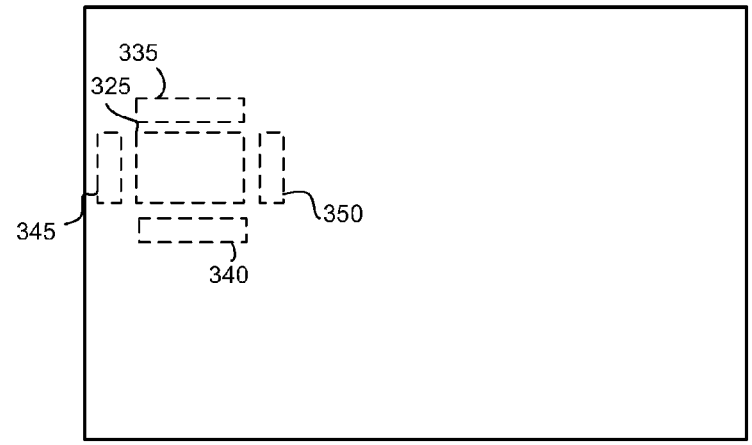

Referring now to FIGS. 5A to 5C, a method of setting an ROI in accordance with another example embodiment of the present disclosure will be described. The method may be carried out, at least in part, by firmware or software such as the camera application 181, executed by the processor 102 and/or image processor 202. Coding of software for carrying out such a method is within the scope of a person of ordinary skill in the art provided the present disclosure. The method may contain additional or fewer processes than shown and/or described, and may be performed in a different order. Computer-readable code executable by at least one processor 102 and/or image processor 202 to perform the method may be stored in a computer-readable medium such as the persistent memory 120.

FIG. 5A shows an electronic viewfinder which displays a real-time image 305 captured by the digital image sensor 208, similar to FIG. 3B, in accordance with another embodiment of the present disclosure. Five (5) default ROIs are defined by the image processor 202 and displayed on the display 112 using respective boundary lines which overlay the real-time image 305. The boundary lines are shown in dotted lines in the illustrated embodiment. The default ROIs in the shown embodiment comprises a centre ROI 325, a top ROI 335, a bottom 340, a left ROI 345, and a right ROI 350. In the shown embodiment, the display 112 is part of a touch-sensitive display 118 and a drag touch gesture may be used to set one or more user-defined ROIs by moving one or more of the default ROIs to a user-designated location, as described above in connection with FIGS. 4A to 4C.

In the FIG. 5A, the entire group of default ROIs 325 is moved leftwards from a region in the real-time image 305 associated with a skier to a region in the real-time image 305 associated with trees. In some embodiments, a starting point of the drag touch gesture must overlap with a boundary of one of the default ROIs to initiate a move of the default ROIs. In other embodiments, the starting point of the drag touch gesture may be anywhere within one of the default ROIs. In yet other embodiments, the starting point of the drag touch gesture may be anywhere within the region collectively defined by the default ROIs, such as the polygonal area defined by the outer edges of the top ROI 335, bottom ROI 340, left ROI 345, and right ROI 350. In this way, a drag touch gesture can be used to move the group of default ROIs by a simple gesture started within the larger region defined by the default ROIs.

In yet other embodiments, the default ROIs 325 may be moved individually rather than as a group. User-defined ROIs may be added in addition to the default ROIs in the default locations, e.g. shown in FIG. 4A or 5A, added in addition to the default ROIs in a moved or changed location (in which the default ROI becomes a user-defined ROI), or added to the default ROIs.

FIGS. 5B and 5C show the electronic viewfinder without the real-time image 305 so that the starting position 410 and ending position 420 of the ROIs can be seen without obstruction. As shown in FIGS. 5B and 5C, the drag touch gesture can be used to easily set one or more user-defined ROIs by moving at least one of the default ROIs from a default position (shown in FIG. 5B) to a new position (shown in FIG. 5C). In other embodiments, other input may be used for a selection of one or more regions within the real-time image 305. For example, a selection of one or more regions within the real-time image 305 may be caused by tapping a user-designated location on the touch-sensitive display 118 to reposition one or more default ROIs or create new user-defined ROIs with or without cancelling the default ROIs. Alternatively, one or more default ROIs may be moved or one or more new user-defined ROIs may be created with or without cancelling the default ROIs using a navigation device (not shown).

Changing User-Defined ROIs

Figure 8:
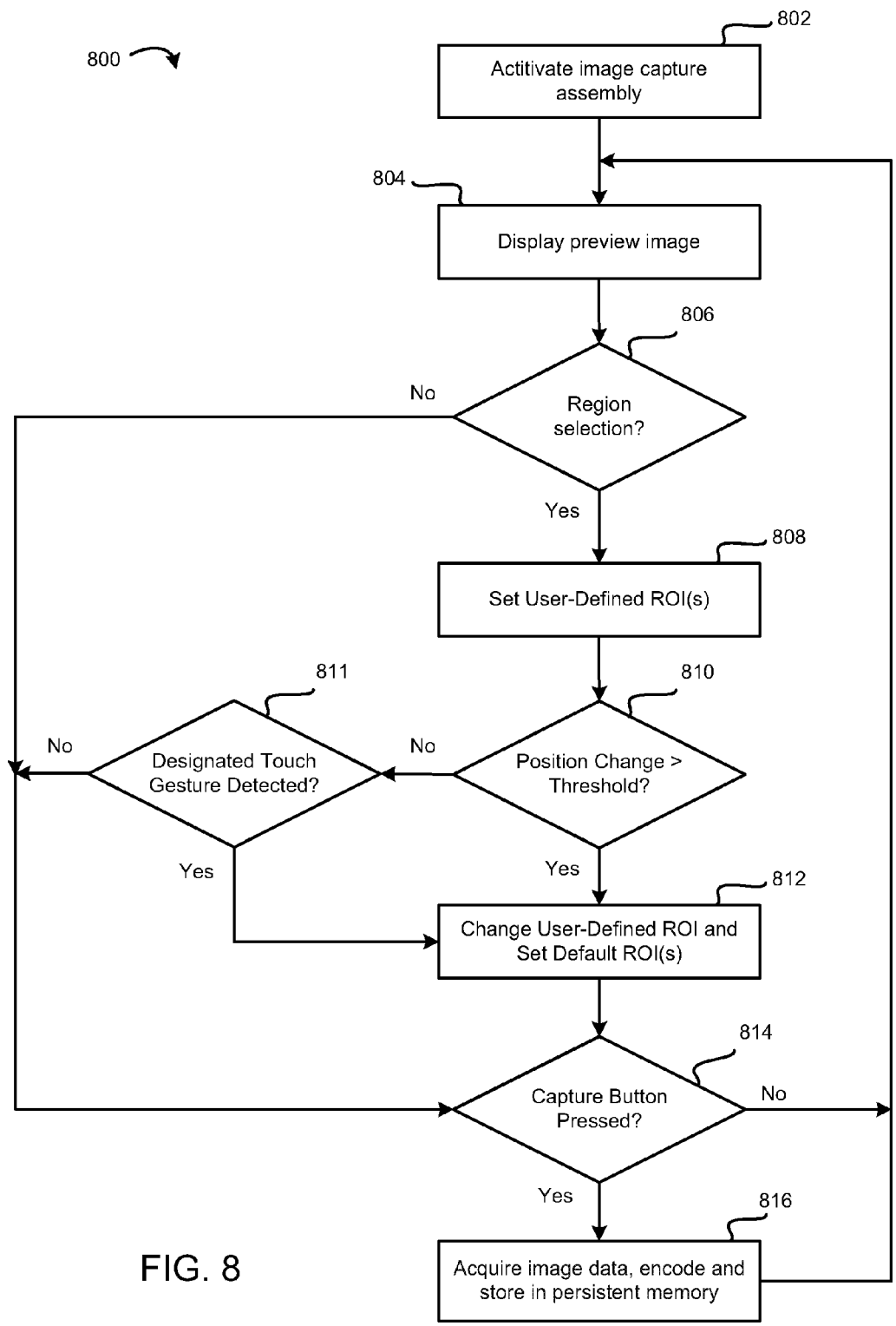
FIG. 8 is a flowchart of a method for operating the image capture device in accordance with one example embodiment of the present disclosure.

FIG. 8 is a flowchart of a method 800 for operating the image capture device 100 in accordance with one example embodiment of the present disclosure. The method 800 may be carried out, at least in part, by firmware or software such as the camera application 181, executed by the processor 102 and/or image processor 202. Coding of software for carrying out such a method 800 is within the scope of a person of ordinary skill in the art provided the present disclosure. The method 800 may contain additional or fewer processes than shown and/or described, and may be performed in a different order. Computer-readable code executable by at least one processor 102 and/or image processor 202 to perform the method 800 may be stored in a computer-readable medium such as the persistent memory 120.

At 802, the image capture assembly 200 is activated, for example, by engaging a camera mode of the image capture device 100. The camera mode can be activated by a camera button or a corresponding menu option displayed on the display 112. The zoom lens 204 is set to a default position which is typically a wide angle position.

At 804, the image sensor 208 receives light which forms an image thereon and outputs digital image data to the display 112. The processor 102 causes the display 112 to display a real-time image 305 based on the digital image data acquired by the image sensor 208. The real-time image 305 provides an image preview which enables a user to compose the images to be acquired based on a real-time preview image 305. As part of the composing, the user may activate zoom buttons to set a field of view. The digital captured image signal C provides captured images for preview on the display 112 and provides captured images for the image processor 202 to perform autofocus calculations.

One or more default ROIs are defined for the real-time image. The default ROIs are typically displayed within the real-time image 305 as an overlay. It is contemplated that in other embodiments, the default ROIs may be defined but not applied or displayed without further input from the user or the image capture device 100. The default ROIs define regions for applying one or more image acquisition parameters, as described more fully below.

At 806, the processor 102 determines whether a selection of one or more regions within the real-time image 305 has been received. The one or more regions within the real-time image are selected using a drag gesture to move the one or more default ROIs to one or more user-designated locations in some embodiments. In other embodiments, the selection may be made by tapping the one or more user-designated locations, navigational input via a navigation device (not shown), or other suitable means. When a selection of one or more regions within the real-time image is received, one or more user-defined ROIs are set in accordance with the selection of one or more regions (808). It will be appreciated that the one or more user-defined ROIs may have a different number than the one or more default ROIs and may have a different configuration than the one or more default ROIs.

In at least some embodiments, a size and shape of each user-defined ROI may be set or changed by contracting the respective ROI, for example by a pinching gesture, or expanding the respective ROI, for example by a stretching gesture. The pinching and stretching gestures are performed with the two-fingers, typically thumb and index finger, while the fingers remain in contact with the touch-sensitive display 118.

The default ROIs have a set number and configuration/arrangement, which may be configurable by the user, as illustrated in the examples of FIGS. 3A to 3C. The number and configuration of the default ROIs may vary between embodiments. The default ROI configuration shown in FIGS. 3A to 3C are merely illustrative, and a different number and configuration of default ROIs may be used in other embodiments.

The user-defined ROIs, in some embodiments, may have the same number and/or configuration as the default ROIs. This allows, for example, a single touch gesture or other input (e.g., navigational input) to move or otherwise reposition a group of ROIs. For example, a user-designated location specified by the selection may be used to specify a centre for the user-defined ROIs such that a centre of a group defaults ROIs is moved from the default position (e.g., centre of the real-time image 305) to the designated location, thereby keeping the number and relative locations of the default ROIs within the group as described above in connection with FIGS. 5A to 5C. Alternatively, the user-defined ROIs may have a different number and/or configuration as the default ROIs.

The user-defined ROIs define regions for applying one or more first image acquisition parameters for focusing and/or exposure metering of the image to be captured. The first image acquisition parameters may include, but are not limited to, one or more of aperture size, exposure time, flash use (yes/no or possibly even an intensity and/or duration of flash), focal distance, or possibly even zoom such as zoom ratio and zoom type (digital/optical). The first image acquisition parameters may also include parameters for image filtering including, but are not limited to, colour filtering or balancing (yes/no or possibly even specification of a type of colour filtering), contrast balancing, noise filtering, or special-effect processing (e.g., posterization). Other image acquisition parameters are also possible.

The first image acquisition parameters may, in some embodiments, define an area within the real-time image 305 to be captured. The area may have a variable size, shape and location. This allows a smaller, cropped image to be captured from the digital image sensor 208. The cropped image may have a standard aspect ratio or custom aspect ratio, depending on the embodiment.

At 810, the processor 102 determines whether a position of the image capture device 100 has changed by an amount which exceeds a threshold amount. The processor 102 may monitor the position of the image capture device 100 via sensor data to determine whether the position of the image capture device 100 has changed more than the threshold amount. Alternatively, the relevant sensor(s) may send an interrupt signal when the position of the image capture device 100 has changed more than the threshold amount.

Figure 7A:
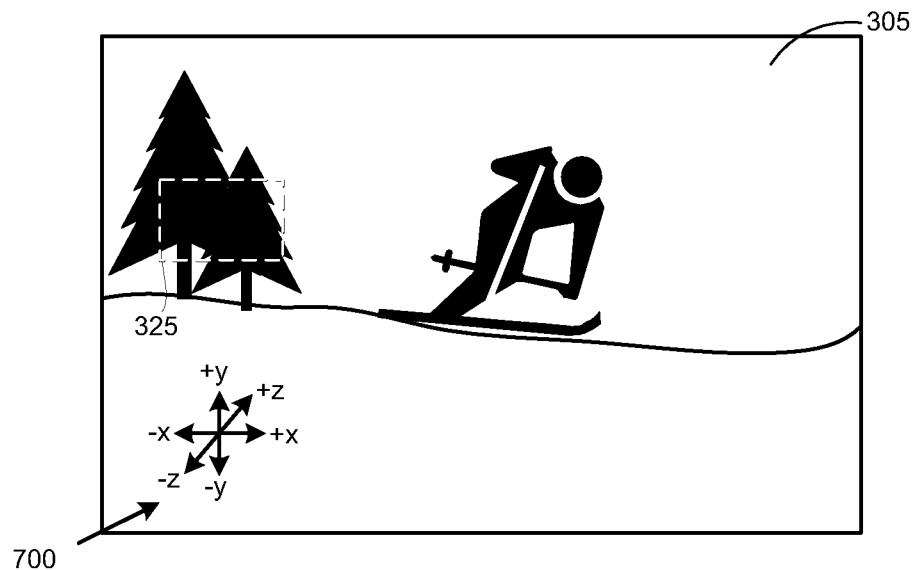
FIGS. 7A and 7B show schematic representations of a user interface screen providing an electronic viewfinder which illustrate a method of resetting one or more ROIs in accordance with an example embodiment of the present disclosure.
Figure 7B:
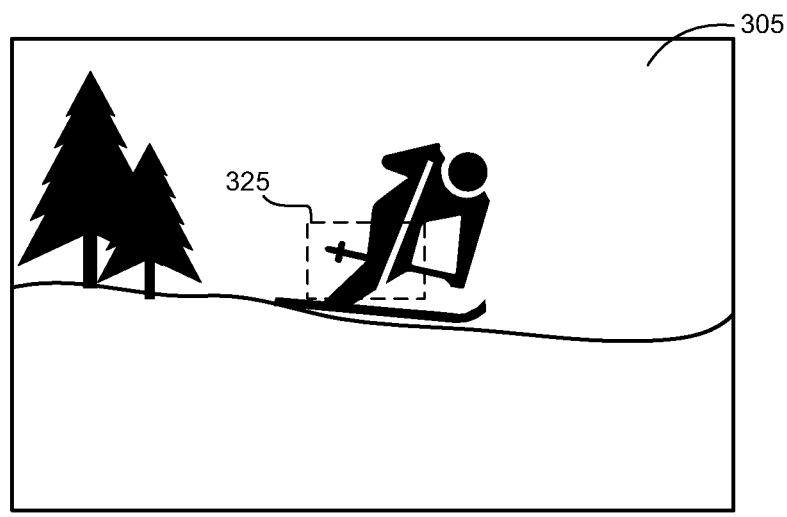

FIG. 7A illustrates a user interface screen with a user-defined ROI 325 which uses the position of the image capture device 100 to reset one or more user-defined ROIs. The position of the image capture device 100 is represented by a three-dimensional coordinate system 700. The three-dimensional coordinate system 700 may be used to illustrate the current device position or a change in device position as a visual cue which may assist the user in limiting movement of the image capture device 100, thereby limiting changes in the position of the image capture device 100. In other embodiments, the three-dimensional coordinate system 700 may be omitted. FIG. 7B illustrates the electronic viewfinder when the one or more user-defined ROIs have been reset to one or more default ROIs in response to a change in the position of the image capture device 100 which is more than the threshold amount.

In some embodiments, the position of the image capture device 100 may comprise a geographical location of the image capture device 100 which is determined in accordance with geographical location information obtained by the GPS 184 or triangulation of location information obtained via base stations (not shown) in the wireless network 101 or triangulation-based geographical location information may be provided to the image capture device 100 by a network component of the wireless network 101. The image capture device 100, via the processor 102 and/or image processor 202, analyzes the determined geographical location to determine whether the geographical location has changed more than the threshold amount from the geographical location of the image capture device 100 when the one or more user-defined ROIs were set. The threshold amount is a distance or range of distances, e.g., between 2-10 ft. or 5-10 ft., between the position at which the one or more user-defined ROIs are set and the current position. The distance may be measured in a straight line, or may consider only a specific direction, e.g. towards or away from a subject in the real-time image 305. The threshold amount may change depending on the image and the conditions under which the image is being captured.

Typically, the processor 102 stores geographical location information describing the geographical location of the image capture device 100 when the one or more user-defined ROIs are set to provide a basis for this determination. The geographical location of the image capture device 100 when the one or more user-defined ROIs were set is stored temporarily in memory, for example, in RAM 108. When the geographical location of the image capture device 100 has changed more than the threshold amount, this indicates that the one or more user-defined ROIs are no longer valid because the position of the image capture device 100 has changed too much.

In some embodiments, the position of the image capture device 100 may comprise an orientation of the image capture device 100 which is determined in accordance with sensed data from the orientation sensor 182 and/or possibly the motion sensor 180. The motion sensor 180, e.g. accelerometer, may be used to sense motion which is converted into device orientation using methods known in the alt. The orientation sensor 182 senses orientation of the image capture device 100 and stores the orientation data temporarily in memory, for example, in RAM 108. The image capture device 100, via the processor 102 and/or image processor 202, analyzes the sensed orientation to determine whether the sensed orientation has changed more than the threshold amount from the orientation of the image capture device 100 when the one or more user-defined ROIs were set.

Typically, the processor 102 stores orientation data describing the orientation of the image capture device 100 when the one or more user-defined ROIs are set to provide a basis for this determination. The orientation of the image capture device 100 when the one or more user-defined ROIs were set is stored temporarily in memory, for example, in RAM 108. When the orientation of the image capture device 100 has changed more than the threshold amount, this indicates that the one or more user-defined ROIs are no longer valid because the position of the image capture device 100 has changed too much.

In some embodiments, the position of the image capture device 100 may comprise a geographical location and an orientation of the image capture device 100.

Proximity data provided by the proximity sensor 186 data could also be used in determining the position of the image capture device 100 in some embodiments.

Figure 6A:
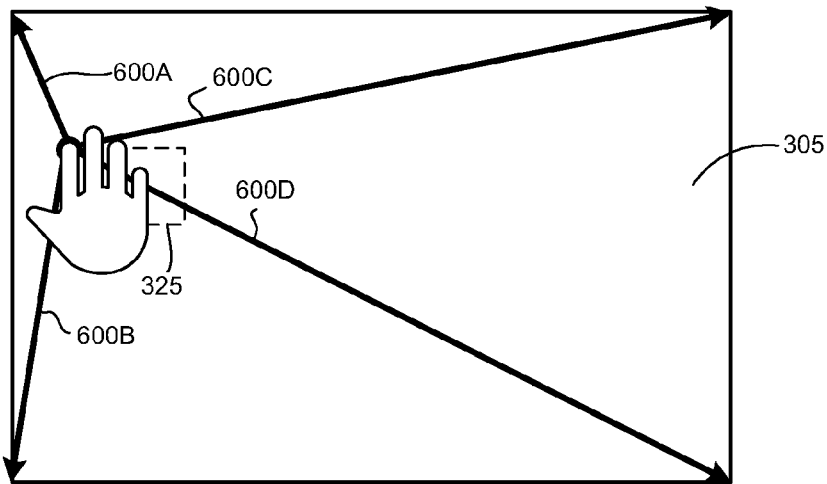
FIGS. 6A to 6C are schematic representations of a user interface screen providing an electronic viewfinder which illustrate a method of resetting one or more ROIs in accordance with examples embodiment of the present disclosure.
Figure 6B:
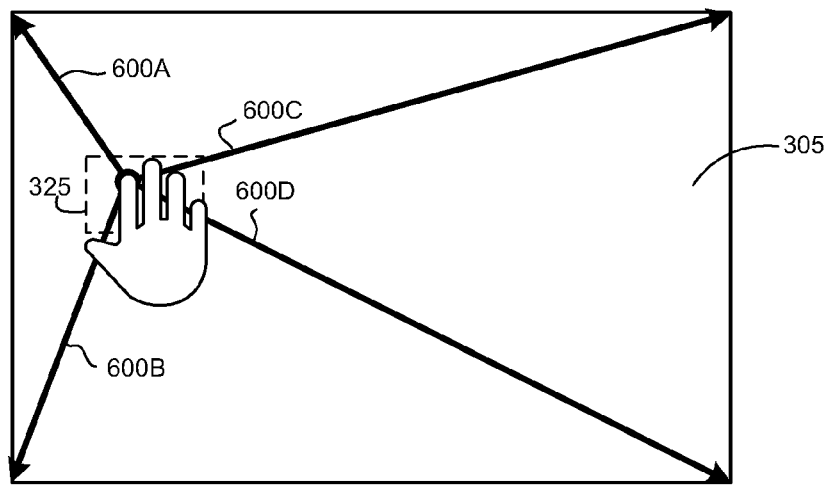
Figure 6C:
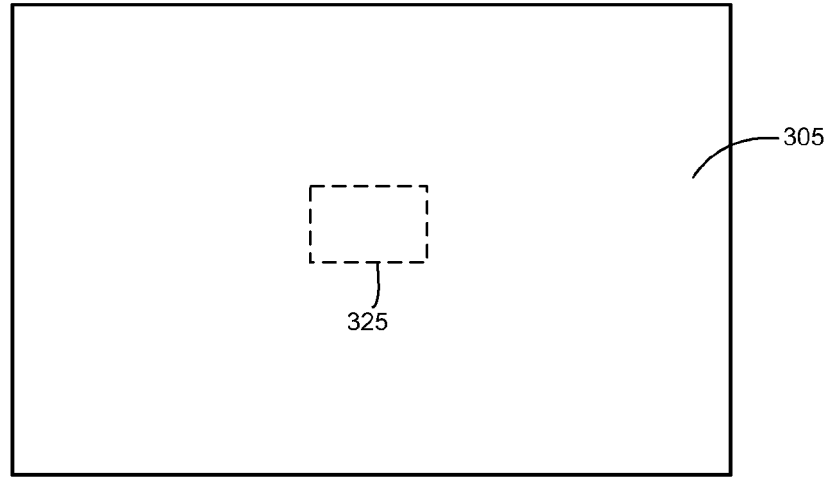

Returning to FIG. 8, at 811, the processor 102 determines whether a designated touch gesture for cancelling user-defined ROIs has been detected on the touch-sensitive display 118 (or otherwise received). The designated touch gesture, in at least some embodiments, is a drag gesture having a starting point within one of the one or more user-defined ROIs and an end point at or near a corner of the touch-sensitive display 118. FIGS. 6A to 6C illustrate the use of a drag gesture to reset one or more user-defined ROIs. In the shown example, the electronic viewfinder displays a single user-defined ROI 325. In some embodiments, the starting point of the drag gesture for cancelling user-defined ROIs must overlap with a boundary of the one or more user-defined ROIs as shown in FIG. 6A. In other embodiment, the starting point may be anywhere within the region collectively defined by the user-defined ROIs, such as the polygonal area defined by the outer edges of the user-defined ROIs as shown in FIG. 6B. In this way, a drag touch gesture can be used to move the group of user-defined ROIs by a simple gesture started within the larger region defined by the default ROIs. FIG. 6C illustrates the electronic viewfinder when the one or more user-defined have been reset to one or more default ROIs in response to the drag gesture for cancelling user-defined ROIs. It will be appreciated that setting a user-defined ROI benefits from the precision offered by a drag gesture whereas precision is less important when cancelling a user-defined ROI. Accordingly, a swipe gesture may be used for the designated touch gesture in other embodiments rather than a drag gesture.

The gesture-action assignments described herein are believed to have potential advantages in several respects, particularly with regards to providing a more natural interaction with the image capture device 100. Providing more natural user-device interaction involves identifying efficient gestures which are relatively easy to perform, relatively easy to remember, have discoverability which allows users to "dis- cover" functions during normal use without formal training, and which can be differentiated from other gestures by users (and by the device) relatively easily. Arbitrary or poorly considered gesture-action assignments create awkward and unnatural user experiences which make the required interaction harder to perform, harder to remember, undiscoverable (or at least less discoverable), and harder to differentiate from other gestures by users. These arbitrary or poorly considered gesture-action assignments waste processing and battery power as users attempt to interact unsuccessfully with the image capture device 100.

The use of a drag gesture in the manner described for setting and cancelling user-defined ROIs is believed to be relatively easy to perform, relatively easy to remember, have discoverability which allows users to "discover" functions during normal use without formal training, and which can be differentiated from other gestures by users (and by the device) relatively easily. The use of similar but different drag gestures for the related but different tasks of setting and cancelling user-defined ROIs is believed to add to enhance this benefit.

Returning again to FIG. 8, at 812, the one or more user-defined ROIs are cancelled and the ROIs are reset to the one or more default ROIs for applying one or more second image acquisition parameters when a position of the image capture device 100 has changed by an amount which exceeds the threshold amount (FIG. 8B) or the designated touch gesture for cancelling user-defined ROIs (e.g., drag touch gesture) is detected (FIG. 6C). The first image acquisition parameters and second image acquisition parameter may be the same or different, depending on the embodiment.

At 814, the processor 102 determines whether the capture button has been pressed or otherwise activated (e.g., an onscreen capture button has been touched). When the capture button has been pressed or otherwise activated, the image processor 202 acquires digital image data of the digital image sensor 208 in accordance with the one or more user-defined ROIs or one or more default ROIs, encodes the acquired digital image data to produce at least one still image, and stores the at least one encoded still image in persistent memory 120 or the removable memory card 132 described above with reference to FIG. 1 (at 816).

The encoding could be, for example, JPEG encoding. In other examples, the encoding is TIFF encoding. The encoded still images can be used for a function related to burst mode, such as but not limited to, panorama images, retro-active burst, image stabilization or a combination thereof. The encoded still images are typically encoded with metadata such as one or more of a date/time the image was captured.

The acquired digital image data corresponds to the image displayed in the real-time preview image when the capture button has been pressed or otherwise activated. The acquiring typically comprises pre-acquisition processing ("pre-processing") of the digital image data. The acquiring, in at least some embodiments, comprises performing region-weighted pre-processing in accordance with the one or more first image acquisition parameters of the one or more user-defined ROIs when one or more user-defined ROIs are set. Region-weighted pre-processing allocates a weighting to be applied to the one or more user-defined ROIs during pre-processing. The weighting depends on the number of user-defined ROIs and may vary between embodiments. If there is one user-defined ROI, the user-defined ROI gets a 100% weighting. However, if there are three (3) user-defined ROIs located towards a top, centre and bottom of the real-time image 305, each user-defined ROI may have an equal weighting or one or more of the user-defined ROIs may have a larger portion of the weighting (e.g., 40% top, 20% centre, 40% bottom, or 80% top, 10% centre, 10% bottom, etc.). The weighting applied to each user-defined ROI may be configurable, for example, after the user-defined ROIs have been set but before the capture button has been pressed or otherwise activated.

In contrast to region-weighted pre-processing, the acquiring comprises performing centre-weighted pre-processing in accordance with the one or more second image acquisition parameters of the one or more default ROIs when one or more default ROIs are set. If there is one user-defined ROI as in FIG. 3A, the user-defined ROI gets a 100% weighting. If there is more than one user-defined ROI as in FIGS. 3B and 3C, the centre ROI 325 is allocated the highest weighting whereas a lesser weighting is allocated to the other ROIs. For example, in the electronic viewfinder of FIG. 3B, the centre ROI 325 may have a weight of 50% whereas the left ROI 345 and right ROI 350 may each have a weight of 15% and the top ROI 335 and bottom ROI 340 may each have a weight of 10%. In the electronic viewfinder of FIG. 3C, the centre ROI 325 may have a weight of 20% whereas the other ROIs 360$a$ to 360$h$ may each have a weight of 10%.

The pre-processing, in at least some embodiments, comprises focusing, exposure metering or both. Post-acquisition processing may also be performed prior to encoding in some embodiments including, for example, applying an image filter.

Figure 9:
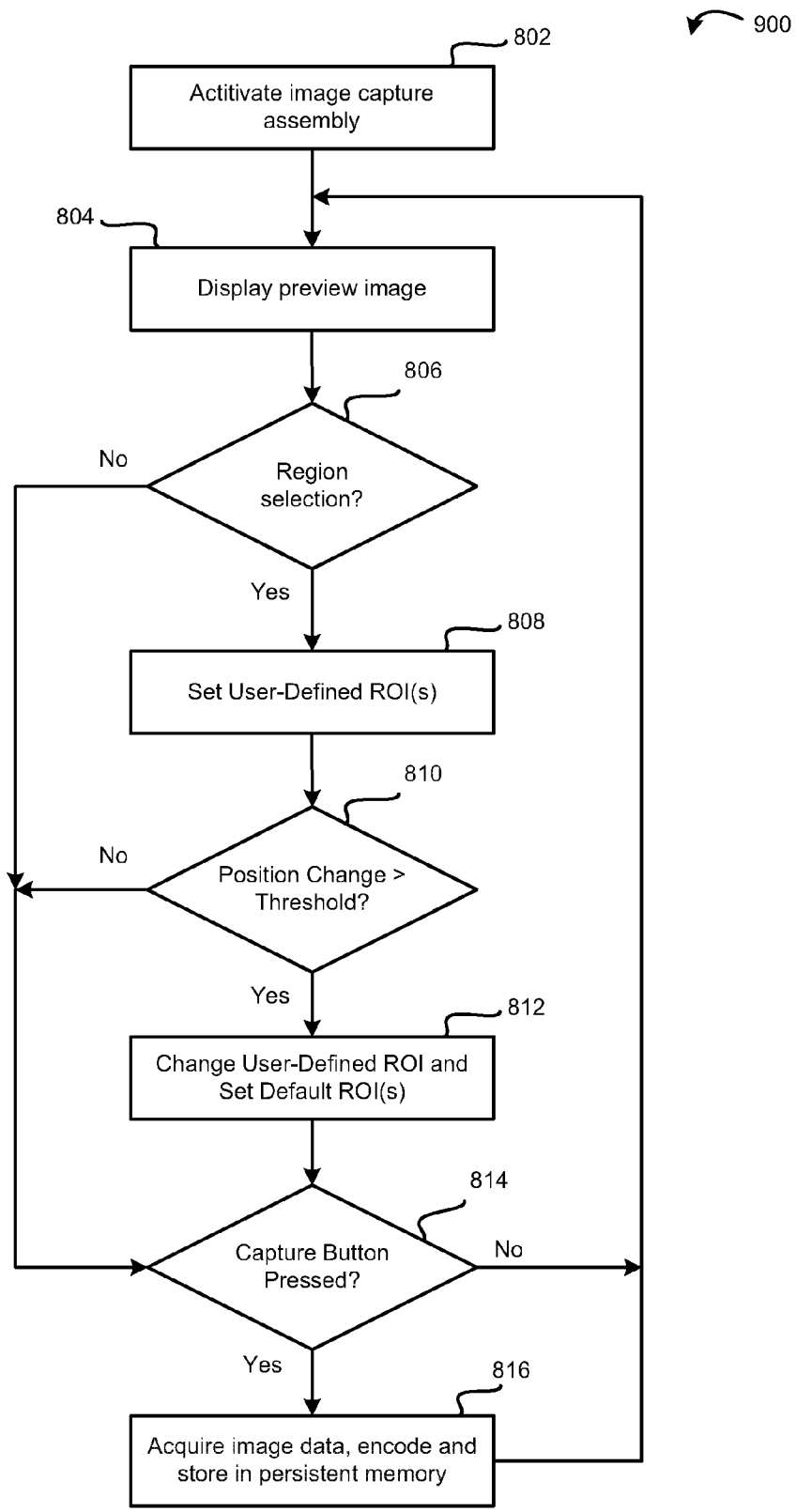
FIG. 9 is a flowchart of a method for operating the image capture device in accordance with another example embodiment of the present disclosure.

FIG. 9 is a flowchart of a method 900 of operating the image capture device 100 in accordance with another example embodiment of the present disclosure. The method 900 is similar to the method 800 with the notable exception that step 811 is omitted so that any user-defined ROIs are canceled and one or more default ROIs are set only when a position of the image capture device 100 has changed by an amount which exceeds the threshold amount. The method 900 is otherwise substantially the same as the method 800.

Figure 10:
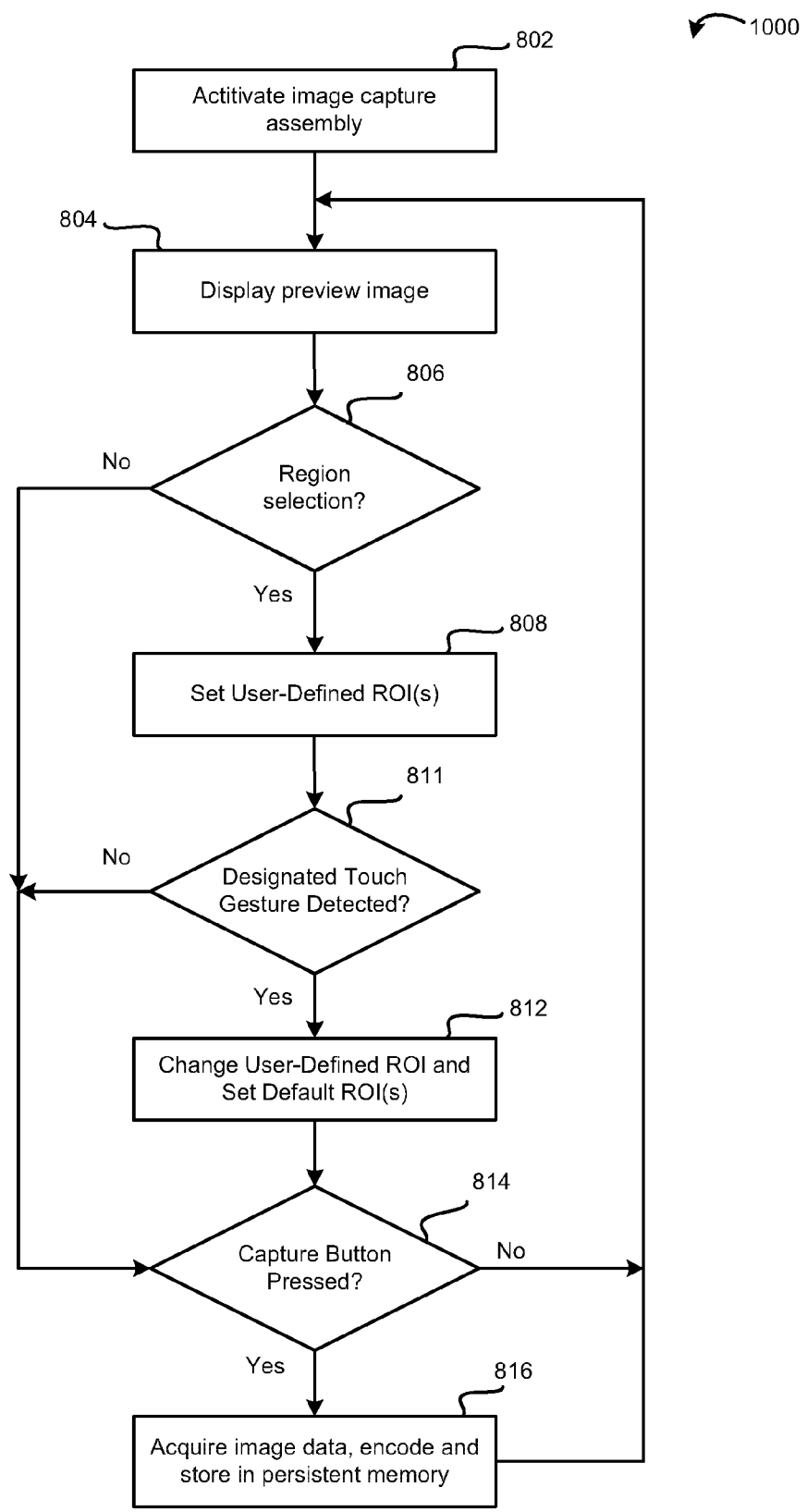
FIG. 10 is a flowchart of a method for operating the image capture device in accordance with a further example embodiment of the present disclosure.

FIG. 10 is a flowchart of a method 1000 of operating the image capture device 100 in accordance with another example embodiment of the present disclosure. The method 1000 is similar to the method 800 with the notable exception that step 810 is omitted so that any user-defined ROIs are canceled and one or more default ROIs are set only when a designated touch gesture for cancelling user-defined ROIs has been detected. The method 1000 is otherwise substantially the same as the method 800.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified. For example, the steps 810 and 811 in FIG. 8 could be performed in a different order.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description.

The invention claimed is:

1. A method of operating an image capture device, the method comprising:
    displaying a real-time image on a display of the image capture device, the real-time image being based on digital image data acquired by a digital image sensor;
    receiving a selection of one or more selected regions within the real-time image;
    setting, in response to the selection, a plurality of regions of interest (ROIs), each ROI being a region defined within the real-time image for applying a respective set of image acquisition parameters, the plurality of ROIs including one or more user-defined ROIs defined in accordance with the one or more selected regions;
    when an input to cancel a given one of the plurality of ROIs is detected, cancelling the given one of the plurality of ROIs while maintaining a remainder of the plurality of ROIs;
    using a signal generated by at least one motion, position or orientation sensor of the image capture device to determine when position or orientation of the image capture device has changed more than a predetermined threshold amount, wherein a determination that the position or orientation of the image capture device has changed more than a predetermined threshold amount is an indicator that the plurality of ROIs are no longer valid;
    when the signal generated by the least one motion, position or orientation sensor indicates that the position or orientation of the image capture device has changed more than the predetermined threshold amount, cancelling all of the plurality of ROIs and setting one or more default ROIs; and
    acquiring digital image data by the digital image sensor in accordance with the remainder of the plurality of ROIs or the one or more default ROIs.

2. The method of claim 1, wherein the acquiring comprises:
    performing region-weighted pre-processing in accordance with the respective sets of image acquisition parameters of the remainder of the plurality of ROIs or the one or more default ROIs.

3. The method of claim 2, wherein the pre-processing comprises focusing.

4. The method of claim 2, wherein the pre-processing comprises exposure metering.

5. The method of claim 1, further comprising:
    monitoring at least one motion, position or orientation signal generated by the at least one motion, position or orientation sensor of the image capture device to determine whether the position or orientation of the device has changed more than the threshold amount.

6. The method of claim 1, wherein the image capture device includes a touch-sensitive display upon which the real-time image is displayed, wherein the input to cancel the given one of the plurality of ROIs comprises detecting a first designated touch gesture on the touch-sensitive display.

7. The method of claim 6, further comprising: when a second designated touch gesture is detected on the touch-sensitive display, cancelling all of the plurality of ROIs and setting the one or more default ROIs.

8. The method of claim 7, wherein the second designated touch gesture is a drag or swipe gesture having a starting point within one of the plurality of ROIs and an end point at or near a corner of the touch-sensitive display.

9. The method of claim 8, wherein the starting point overlaps with a boundary of the plurality of ROIs or one or more default ROIs.

10. The method of claim 6 further comprising:
when a second designated touch gesture is detected on the touch-sensitive display, moving all of the plurality of ROIs as a group in accordance with the second designated touch gesture.

11. The method of claim 1, wherein the position of the image capture device comprises a geographical location of the image capture device.

12. The method of claim 1, wherein a boundary of the plurality of ROIs or the one or more default ROIs is displayed on a display of the image capture.

13. The method of claim 1, further comprising encoding the acquired digital image data to produce at least one still image.

14. The method of claim 13, further comprising storing the at least one still image in persistent memory.

15. The method of claim 1, wherein the respective sets of image acquisition parameters are different between the plurality of ROIs and the one or more default ROIs.

16. The method of claim 1, wherein the plurality of ROIs comprises at least one default ROI and at least one user-defined ROI.

17. The method of claim 1, further comprising sending an interrupt signal from the at least one motion, position or orientation sensor when the position or orientation of the image capture device has changed more than the predetermined threshold amount.

18. An image capture device, comprising:
a digital image sensor;
a display;
an image encoder for encoding digital image data into still images;
at least one motion, position or orientation sensor; and
an image processor coupled to the digital image sensor, the image encoder and the display, the image processor being configured to:
display a real-time image on a display of the image capture device, the real-time image being based on digital image data acquired by the digital image sensor;
receive a selection of one or more selected regions within the real-time image;
set, in response to the selection, a plurality of regions of interest (ROIs), each ROI being a region defined within the real-time image for applying a respective set of image acquisition parameters, the plurality of ROIs including one or more user-defined ROIs defined in accordance with the one or more selected regions;
when an input to cancel a given one of the plurality of ROIs is detected, cancel the given one of the plurality of ROIs while maintaining a remainder of the plurality of ROIs;
use a signal generated by the at least one motion, position or orientation sensor to determine when position or orientation of the image capture device has changed more than a predetermined threshold amount, wherein a determination that the position or orientation of the image capture device has changed more than a predetermined threshold amount is an indicator that the plurality of ROIs are no longer valid;
when the signal generated by the at least one motion, position or orientation sensor indicates that the position or orientation of the image capture device has changed more than the predetermined threshold amount and, cancel all of the plurality of ROIs and set one or more default ROIs; and
acquire digital image data by the digital image sensor in accordance with the remainder of the plurality of ROIs or the one or more default ROIs.

19. The image capture device of claim 18, wherein the image processor is further configured to monitor at least one motion, position or orientation signal generated by the at least one motion, position or orientation sensor to determine whether the position or orientation of the image capture device has changed more than the threshold amount.

20. The image capture device of claim 18, where the at least one motion, position or orientation sensor is configured to send an interrupt signal to the image processor when the position or orientation of the image capture device has changed more than the predetermined threshold amount.

* * * * *